United States Patent
Dale et al.

(10) Patent No.: US 9,752,537 B2
(45) Date of Patent: Sep. 5, 2017

(54) ENGINE SYSTEMS AND METHODS FOR OPERATING AN ENGINE

(71) Applicant: Cummins Inc., Columbus, IN (US)

(72) Inventors: Adrian P. Dale, Columbus, IN (US); Michael D. Dolton, Holmfirth (GB); Samuel C. Geckler, Columbus, IN (US); James Alexander McEwen, West Yorkshire (GB); Nicholas Kenneth Sharp, Wakefield (GB); Stephen Edward Garrett, West Yorkshire (GB); Anthony Kyle Perfetto, Columbus, IN (US)

(73) Assignee: Cummins Inc., Columbus, IN (US)

( * ) Notice: Subject to any disclaimer, the term of this patent is extended or adjusted under 35 U.S.C. 154(b) by 105 days.

(21) Appl. No.: 14/717,566

(22) Filed: May 20, 2015

(65) Prior Publication Data

US 2015/0345433 A1 Dec. 3, 2015

(30) Foreign Application Priority Data

May 30, 2014 (GB) .................................. 1409677.0

(51) Int. Cl.
*F02B 33/44* (2006.01)
*F02M 25/07* (2006.01)
(Continued)

(52) U.S. Cl.
CPC ......... *F02M 25/0749* (2013.01); *F01D 9/026* (2013.01); *F02B 37/025* (2013.01);
(Continued)

(58) Field of Classification Search
CPC ...... F01D 9/026; F01N 13/107; F02B 37/025; F02C 6/12; F02M 25/0749; F02M 26/43; F05D 2220/40
See application file for complete search history.

(56) References Cited

U.S. PATENT DOCUMENTS

| 4,179,892 A | * | 12/1979 | Heydrich | ................ F02B 37/00 60/605.2 |
| 4,249,382 A | | 2/1981 | Evans et al. | |

(Continued)

FOREIGN PATENT DOCUMENTS

| FR | 2805851 A1 | 9/2001 |
| GB | 2349179 A | 10/2000 |

(Continued)

OTHER PUBLICATIONS

United Kingdom Intellectual Property Office, Search Report issued in Application No. 1409677.0, dated Mar. 13, 2015, 5 pp.

*Primary Examiner* — Jesse Bogue
(74) *Attorney, Agent, or Firm* — Taft, Stettinius & Hollister LLP

(57) ABSTRACT

A unique engine system has an engine with a dedicated exhaust gas recirculation cylinder, an EGR system that receives exhaust gas from the dedicated cylinder, and a turbocharger having turbine inlet ports in fluid communication with other engine cylinders via a plurality of exhaust passages. At least two of the exhaust passages are substantially isolated from each other. Other embodiments include apparatuses, systems, devices, hardware, methods, and combinations for engines and engine systems.

8 Claims, 4 Drawing Sheets

(51) Int. Cl.
*F02C 6/12* (2006.01)
*F01D 9/02* (2006.01)
*F02M 26/43* (2016.01)
*F02B 37/02* (2006.01)
*F01N 13/10* (2010.01)

(52) U.S. Cl.
CPC ............... *F02C 6/12* (2013.01); *F02M 26/43* (2016.02); *F01N 13/107* (2013.01); *F05D 2220/40* (2013.01); *Y02T 10/144* (2013.01)

(56) References Cited

U.S. PATENT DOCUMENTS

| | | | | |
|---|---|---|---|---|
| 4,544,326 A | * | 10/1985 | Nishiguchi | F01D 9/026 415/151 |
| 5,987,884 A | * | 11/1999 | Kibe | B01D 53/9495 123/443 |
| 6,073,447 A | * | 6/2000 | Kawakami | F01D 9/026 60/602 |
| 6,260,358 B1 | * | 7/2001 | Daudel | F02B 37/02 415/42 |
| 6,324,847 B1 | * | 12/2001 | Pierpont | F02B 37/02 415/116 |
| 6,694,735 B2 | * | 2/2004 | Sumser | F01D 17/141 123/559.1 |
| 7,269,950 B2 | | 9/2007 | Pedersen et al. | |
| 7,428,814 B2 | * | 9/2008 | Pedersen | F01D 9/026 415/202 |
| 8,196,403 B2 | * | 6/2012 | Hittle | F02M 26/47 60/602 |
| 8,256,402 B2 | | 9/2012 | Yamagata et al. | |
| 8,424,304 B2 | | 4/2013 | Serres et al. | |
| 8,439,021 B2 | | 5/2013 | Vuk | |
| 8,443,603 B2 | | 5/2013 | Hayman et al. | |
| 2003/0154717 A1 | * | 8/2003 | Schmid | F02B 37/02 60/605.2 |
| 2005/0086936 A1 | * | 4/2005 | Bucknell | F01D 9/026 60/602 |
| 2005/0247058 A1 | * | 11/2005 | Pedersen | F01D 17/14 60/599 |
| 2008/0000460 A1 | * | 1/2008 | Hertweck | F02B 37/025 123/559.1 |
| 2011/0088391 A1 | * | 4/2011 | Sumser | F01D 17/141 60/602 |
| 2011/0302917 A1 | | 12/2011 | Styles et al. | |
| 2012/0285163 A1 | | 11/2012 | Hayman et al. | |
| 2013/0000300 A1 | * | 1/2013 | O'Hara | F01D 9/026 60/605.2 |
| 2013/0152908 A1 | * | 6/2013 | Choi | F02D 41/0065 123/568.11 |
| 2014/0208727 A1 | * | 7/2014 | Hayman | F01N 13/06 60/323 |
| 2014/0223903 A1 | | 8/2014 | Keating | |
| 2014/0331667 A1 | | 11/2014 | Kindl et al. | |
| 2014/0366532 A1 | * | 12/2014 | Talwar | F02M 26/43 60/605.2 |

FOREIGN PATENT DOCUMENTS

| | | |
|---|---|---|
| WO | 2011031595 A2 | 3/2011 |
| WO | 2012061545 A2 | 5/2012 |

\* cited by examiner

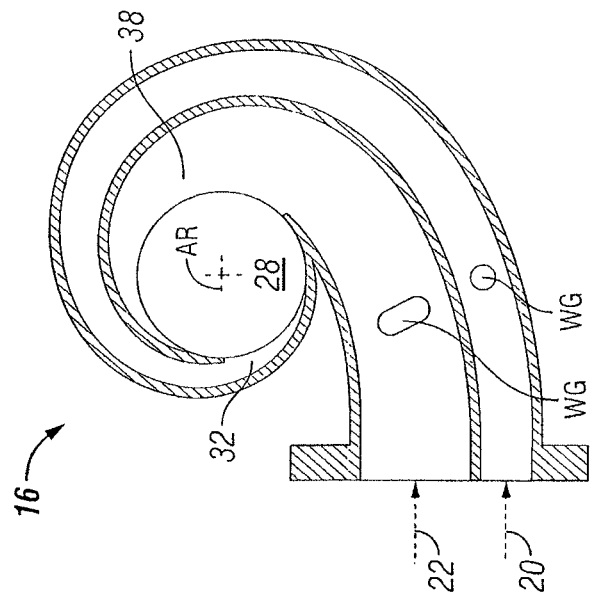
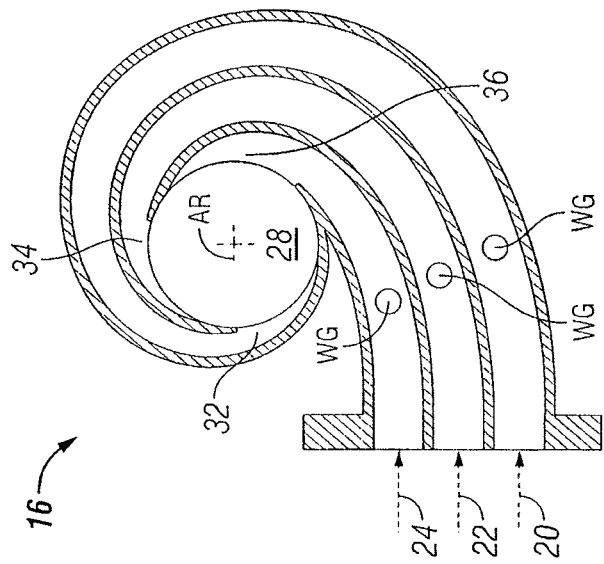
FIG. 2A
FIG. 2B

ENGINE SYSTEMS AND METHODS FOR OPERATING AN ENGINE

FIELD OF THE INVENTION

The present invention relates to internal combustion engines, and in particular, engine systems having turbochargers and exhaust gas recirculation systems.

BACKGROUND

Engine systems, such as internal combustion engine systems, are employed in a wide variety of air, water and land-based vehicles. Enhancing mechanical and emissions performance, and efficiency remain an area of interest. Some existing systems have various shortcomings, drawbacks, and disadvantages relative to certain applications. Accordingly, there remains a need for further contributions in this area of technology.

SUMMARY

One embodiment of the present invention includes a unique engine system having an engine with a dedicated exhaust gas recirculation (EGR) cylinder, an EGR system that receives exhaust gas from the dedicated cylinder, and a turbocharger having turbine inlet ports in fluid communication with other engine cylinders via a plurality of exhaust passages, wherein at least two of the exhaust passages are substantially isolated from each other. Other embodiments include apparatuses, systems, devices, hardware, methods, and combinations for engines and engine systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIGS. 2A and 2B schematically depict some aspects of non-limiting examples of a turbocharger and exhaust passages coupled thereto in accordance with an embodiment of the present invention.

DETAILED DESCRIPTION

Figure 1:
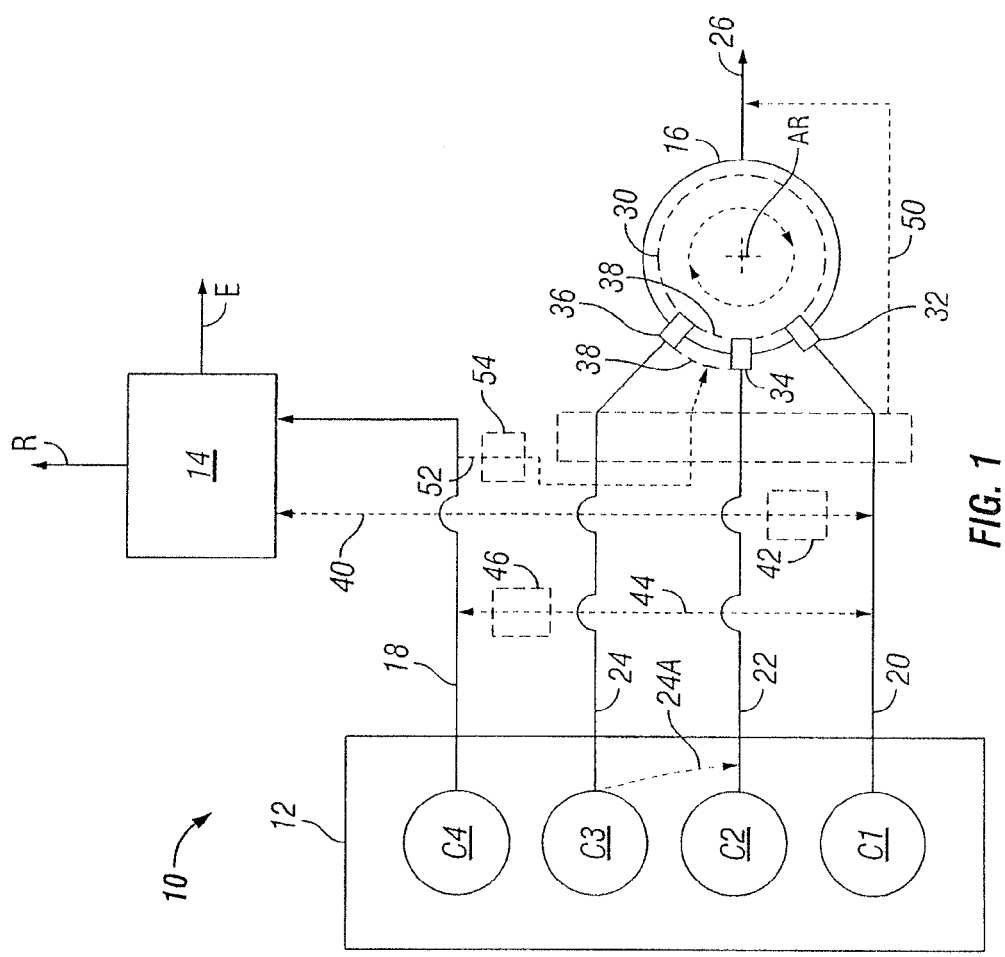
FIG. 1 schematically depicts some aspects of non-limiting examples of an engine system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to FIG. 1, some aspects of non-limiting examples of an engine system 10 in accordance with an embodiment of the present invention are schematically depicted. Engine system 10 includes an internal combustion engine 12, an EGR system 14, a turbocharger 16. In one form, engine 12 is a 4-cylinder engine, and includes cylinders C1, C2, C3 and C4. In other embodiments, engine 12 may include any number of cylinders. In the form of a 4-cylinder engine, engine 12 includes an exhaust passage 18, an exhaust passage 20, an exhaust passage 22 and an exhaust passage 24. In various embodiments, the number of exhaust passages may vary with the needs of the particular application. The exhaust passages may take any form appropriate to the needs of the particular application, including, for example and without limitation, pipes, manifolds, passages within castings or forging, or tubes or the like, etc.

EGR system 14 is operative to receive exhaust gas from engine 12, and to direct at least a portion R of the exhaust gas to engine 12 cylinders for intake, along with the air/fuel mixture delivered by the air and fuel metering systems of engine 12, during the operation of engine 12. In one form, engine 12 includes a dedicated EGR cylinder, which in the depicted embodiment is cylinder C4. In other embodiments, any one or more cylinders of engine 12 may be dedicated EGR cylinders. A dedicated EGR cylinder of engine 12, is a cylinder, the exhaust gases of which are dedicated for use by EGR system 14. In one form, all of the exhaust gases from the dedicated EGR cylinder are directed to and employed by EGR system 14. In some embodiments, excess exhaust gases may be diverted from the dedicated EGR cylinder prior to entry into EGR system 14. In some embodiments, exhaust gases from one or more other cylinders may be directed to EGR system 14 in order to supplement the exhaust gases supplied from the dedicated EGR cylinder. In any event, a dedicated EGR cylinder is a cylinder that supplies exhaust gases to the EGR system, e.g., EGR system 14, at all times during which exhaust gases are designated to be supplied for exhaust gas recirculation for intake into engine 12, in some embodiments, exclusively, and in other embodiments, wherein the exhaust gases supplied to the EGR system from the designated EGR cylinder are supplemented by those from another cylinder or are vented or diverted to destinations other than the EGR system. In various embodiments, EGR system 14 may employ a bypass valve to direct excess exhaust gases E, e.g., the amount of exhaust gases in exceedance of the needs of EGR system 14 for delivery to the intake of engine 12, to another location, for example, into turbocharger 16 or into an overboard exhaust stream 26, e.g., the tail pipe of a motor vehicle.

Turbocharger 16 is configured to extract energy from the exhaust of engine 12, and to compress air for intake into engine 12. Turbocharger 16 includes a turbine 28 and a plurality of inlet ports that are adjacent to turbine 28, i.e., immediately adjacent to turbine 28, whereby exhaust gases supplied to one inlet port are substantially isolated from exhaust gases supplied to another inlet port. In some embodiments, turbocharger 16 may include a turbine nozzle, indicated by dashed line 30, for controlling and/or directing flow into turbine 28, in which case turbine nozzle 30 is considered a part of turbine 28. In one form, turbocharger 16 includes three (3) inlet ports, designated inlet port 32, inlet port 34 and inlet port 36. In other embodiments, the number of inlet ports may vary with the needs of the application. In some embodiments, inlet port 34 and inlet port 36 may be in fluid communication with each other, i.e., not fluidly isolated from each other, as indicated by dashed lines 38, which is referred to herein as inlet port 38. In some embodiments, inlet port 38 may be the full or partial summation of inlet ports 34 and 36. In some embodiments, the inlet ports are spaced apart from each other circumferentially about turbine 28. In other embodiments, the inlet ports are spaced apart from each other along turbine 28 in the axial direction, i.e., spaced apart along the axis of rotation AR of turbine 28. In other embodiments, the inlet ports may be spaced apart from each other both axially and circumferentially.

In one form, exhaust passages 18, 20, 22 and 24 are coupled directly to respective cylinders C4, C1, C2 and C3, that is, exhaust passages 18, 20, 22 and 24 are not cross-linked adjacent to cylinders C4, C1, C2 and C3, e.g., as by an exhaust manifold. In other embodiments, one or more of exhaust passages 18, 20, 22 and 24 may be cross-linked adjacent to one or more of cylinders C4, C1, C2 and C3 by a manifold or other passage or piping scheme. Exhaust passage 18 fluidly couples dedicated EGR cylinder C4 with EGR system 14, and is operative to supply exhaust gases received from dedicated cylinder C4 to EGR system 14. In one form, exhaust passage is isolated from exhaust passages 20, 22 and 24. In one form, exhaust passages 20, 22 and 24 fluidly couple cylinders C1, C2 and C3 to inlet ports 32, 34 and 36 respectively, whereby the exhaust pressure pulses are separated as a result of being contained within separate exhaust passages 20, 22 and 24 that are isolated from each other. In some embodiments, including some embodiments described herein, one or more of exhaust passages 18, 20, 22 and 24 may not be isolated from each other.

The inventors have determined that it is desirable to separate exhaust pressure events originating in one cylinder from exhaust pressure events originating in one or more other cylinders. Accordingly, various embodiments may employ one or more of various schemes in order to prevent overlap of the exhaust pressure events from different cylinders. Various embodiments may employ physical separation of the exhaust pressure events, temporal separation of the exhaust pressure events or both. By "temporal separation," it is meant that the pulses are separated in time, such that one exhaust pressure event does not substantially interfere with another exhaust pressure event, e.g., does not create undesirable back pressure pulses. In some embodiments, one or more exhaust manifolds may be employed, which may fluidly couple two or more cylinders or exhaust ports. For example in some embodiments, two cylinder exhaust ports maybe combined for delivery to turbocharger 16. In such embodiments, the exhaust passage effective flow area and/or effective flow area of the turbine inlet may have a larger size, e.g. twice the size for a single exhaust port exhaust passage. In other embodiments, the size may vary e.g. depending upon the characteristics of the exhaust pressure pulses of the cylinders that are combined. For example, characteristics for consideration may include the pressure pulse duration, the overlap between pressure pulses for the two or more cylinders that are to have a combined exhaust passage, the magnitude of the pressure pulses emanating from the cylinders, and/or the shape of the pressure pulse curves and pressure decay characteristics. In some embodiments, the exhaust flow may also or alternatively be combined by sizing one or more inlet ports of turbine 28 to accommodate the desired flow.

In one form, the firing order of engine 12 is 1-3-4-2, that is, C1-C3-C4-C2. Exhaust passage 18 fluidly couples dedicated EGR cylinder C4, i.e., the exhaust port of cylinder C4, to EGR system 14, and is operative to supply exhaust gases from dedicated EGR cylinder C4 to EGR system 14. Exhaust passage 20 fluidly couples cylinder C1, i.e. the exhaust port of cylinders C1, directly to inlet port 32 of turbocharger 16. Exhaust passage 22 fluidly couples cylinder C2, i.e., the exhaust port of cylinder C2, directly to inlet port 34 of turbine 28.

In one form, exhaust passages 20 and 22 are structured to separate exhaust pressure events originating in cylinder C1 from exhaust pressure events originating in cylinder C2, by physically or mechanically isolating the exhaust pressure events by virtue of exhaust passages 20 and 22 being formed as isolated passages that effectively extend to within immediate proximity to the respective inlet ports 32 and 34 of turbine 28, such that interaction between pressure pulses along the length of the exhaust passages is essentially eliminated, whereby interaction is limited essentially by leakage around the periphery of turbine 28 (and/or face of turbine 28 for those embodiments employing an axial turbine alone or in conjunction with a radial turbine). Thus, the exhaust pressure pulses originating in cylinder C1 are delivered to turbine 28 essentially independently of the exhaust pressure pulses originating in cylinder C2. It will be understood that some limited interaction may take place for those embodiments having a wastegate valve, e.g., when open or partially open, although it will be equally understood that any such interactions are negligible and yield no substantial or effective interaction between the isolated passages or pressure pulses passing therethrough.

In some embodiments, one or more of engine 12 cylinders may share in full or in part an exhaust passage. For example, in some embodiments described herein, effective separation of exhaust pressure events may be obtained by selecting cylinder/exhaust passages for combination based on the firing order of engine 12. For example, whereas combining the flow from cylinders C1 and C3 may result in undesirable pressures and/or pressure dynamics, owing to the adjacency of cylinders C1 and C3 in the firing sequence, it may not be undesirable or may indeed be desirable in some embodiments to combine exhaust flow from cylinders C2 and C3, because the temporal displacement between the firing pulses is greater, e.g., than the temporal displacement between the firing pulses as between cylinders C1 and C3. That is, because cylinders C3 fires immediately after cylinder C1 in the firing order, the combination of the pressure pulses may result in higher than desired pressures during the discharge of the exhaust from the cylinders, and may also result in undesirable pressures subsequently, e.g., pressure drops and/or undesirable pressure dynamics after the pressure wave dissipates and is absorbed into turbine 28.

On the other hand, because the exhaust pressure pulses from cylinders C2 and C3 have a greater temporal displacement therebetween, a more even or consistent pressure profile may be maintained within the combined exhaust passage. In various embodiments, the exhaust passages may be combined or joined at any desired point, e.g., adjacent the cylinder, at the turbine inlet port, along the length of the exhaust passage, or any combination thereof. In some embodiments, exhaust flow may be provided asymmetrically to turbine 28, e.g., by supplying the output of a combined exhaust passage to a turbine inlet port that is larger in effective flow area than a turbine inlet port that receives flow from only a single cylinder, which is referred to herein as an asymmetric input port scheme or asymmetric injection or an asymmetric turbocharger 16 or the like. In various embodiments, nozzle 30 may be configured to govern the effective flow area into turbine 28, e.g., without regard to the size of the exhaust or other passages leading to the inlet port or turbine 28, and without regard to the flow area of the inlet port. Thus, the asymmetry may be provided by changing the vane spacing, vane angle, vane thickness or other parameters to yield asymmetric exhaust gas injection into turbine 28, thus providing selectively greater or lesser effective flow areas into the turbine 28 at one or more inlet port locations, notwithstanding the effective flow areas of the exhaust passages or turbocharger 16 housing passages that deliver the exhaust gases to turbine 28.

For example, in some embodiments, an exhaust passage 24A is used in place of exhaust passage 24, e.g., as an alternate configuration (it will be understood that in some embodiments, both exhaust passage 24 and exhaust passage 24A may be employed). Exhaust passages 24A couples cylinder C3 to cylinder C2 and hence, the exhaust flow from both cylinders C2 and C3 are directed to turbine 28 via exhaust passage 22. Although exhaust passage 24A is illustrated as apparently extracting the exhaust gases directly from cylinder C3, e.g., the exhaust port, it will be understood that in FIG. 1 is a schematic in nature, and that the actual location of joinder between cylinders C2 and cylinder C3 may take place at any location suitable for the particular application. Inlet ports 34 and 36 may be combined to yield an inlet port 38 having a larger effective flow area than either of inlet ports 34 and 36.

In some embodiments, exhaust passage 24 fluidly couples cylinder C3, e.g., the exhaust port of cylinder C3, directly to inlet port 36 of turbine 28. In one form, exhaust passages 20, 22 and 24 are structured to separate exhaust pressure events originating in cylinders C1, C2 and C3 from each other by physically or mechanically isolating the exhaust pressure events by virtue of exhaust passages 20, 22 and 24 being formed as isolated exhaust passages that effectively extend into immediate proximity to the respective inlet ports 32 and 34 of turbine 28. Thus, the exhaust gases originating in cylinder C1 are delivered to turbine 28 independently of the exhaust gases originating in cylinders C2 and C3; the exhaust gases originating in cylinder C2 are delivered to turbine 28 independently of the exhaust gases originating in cylinders C1 and C3; and the exhaust gases originating in cylinder C3 are delivered to turbine 28 independently of the exhaust gases originating in cylinders C1 and C2. In some embodiments, this may yield a symmetric input port scheme, whereby each inlet port to turbine 28 has the same effective flow area, which may also be referred to as symmetric inlet ports, symmetric injection or a symmetric turbocharger 16 or the like. In some embodiments, turbocharger 16 may include a wastegate valve 48 operative to bleed exhaust gases from one or more exhaust passages 20, 22, 24 to bypass those gases around turbocharger 16, e.g., exhaust gases in an amount beyond that needed for the desired boost level of turbocharger 16, which may be directed to the tail pipe via a passage 50.

Certain operating conditions, engine design parameters, emissions requirements or other constraints may render it desirable to provide exhaust gas to EGR system 14 beyond that which a single cylinder, e.g., cylinder C4, is capable of providing. Accordingly, in some embodiments, one or more of the other exhaust passages or cylinders may be configured to direct all or a portion of its flow into EGR system 14. Such embodiment is illustrated in FIG. 1, wherein a passage 40 fluidly couples exhaust passage 20 to EGR system 14, which may be employed to supplement the exhaust gases provided via exhaust passage 18. It will be understood that one or more other exhaust passages may be coupled to EGR system 14 in addition to or in place of exhaust passage 20. In any event, in such a case, cylinder C4 will remain a dedicated EGR cylinder, although it's provision of exhaust gases may be supplemented by the output of cylinder C1, e.g., as the needs for exhaust gas recirculation demand, or where the extra exhaust gas supplied to EGR system 14 yields an advantage, e.g., increased performance and/or efficiency, or reduction in emissions. In some embodiments, a valve 42 may be employed to regulate the amount of exhaust gases bled from exhaust passage 20. In other embodiments, EGR system 14 may be configured to regulate the amount of flow extracted from exhaust passage 20. In still other embodiments a simple orifice or other flow restrictor may be employed. Passage 40 and valve 42 are illustrated using dashed lines to indicate various embodiments may or may not employ passage 40, or may not employ valve 42. In yet still other embodiments, passage 40 and/or valve 42 may be configured to direct exhaust gases from EGR system 14 into exhaust passage 20, e.g., excess pressure that would have been otherwise directed to the tailpipe, but instead may be used to supply power to turbine 28 e.g., during operations when the wastegate 48 is closed, and additional boost may be desired.

In some situations, e.g., during operating conditions in which the exhaust gas output of cylinder C4 exceeds the requirements or ability of EGR system 14 or the need for exhaust gas recirculation, some embodiments of the present invention may include a passage 44 configured to supply exhaust gases from cylinder C4 into one or more of the other exhaust passages or directly into turbine 28, which may be desirable during certain operating conditions, such as where additional boost may be desired, but is otherwise unlikely to be achieved based on the output of cylinders C1, C2 and C3 alone. In the illustration of FIG. 1, passage 44 fluidly couples exhaust passage 20 with exhaust passage 18. In some embodiments, passage 44 may be configured, e.g. via gas dynamics, to both direct flow from exhaust passage 20 into exhaust passage 18 (and hence into EGR system 14) during certain operating conditions or at particular points in time, and to likewise direct flow from exhaust passage 18 into exhaust passage 20. In some embodiments, a valve 46 may be employed to regulate or control the flow of exhaust gas as between exhaust passage 18 and exhaust passage 20 via passage 44. In other embodiments, passages 44 and 40 may be combined, so that exhaust gases may be able to selectively flow between exhaust passage 18, another exhaust passage, e.g., exhaust passage 20, and EGR system 14, e.g., which may be controlled with one or more valves, such as valves 42 and/or 44. In some embodiments, the additional boost from cylinder C4 may be obtained via a passage 52 fluidly coupling exhaust passage 18 with an inlet port of turbine 28, e.g. inlet port 38 or any other appropriate inlet port. Some such embodiments may employ a valve 54 to regulate the use of cylinder C4 for providing boost. In some embodiments, passage 50 may be regulated by wastegate valve 48 as with the other exhaust passages.

Referring now to FIGS. 2A and 2B, some aspects of a non-limiting example of a turbocharger having volute-shaped turbine 28 inlet ports is schematically illustrated in accordance with an embodiment of the present invention. In FIG. 2A, exhaust passages 20, 22 and 24 are illustrated as being in fluid communication with respective inlet ports 32, 34 and 36, and are isolated from each other as much as is practicable. The illustration of FIG. 2A represents a symmetric inlet port configuration, wherein the inlet ports are spaced apart circumferentially about turbine 28, and in the illustrated embodiment, each inlet port is approximately 120° in arc length. In FIG. 2B, the exhaust flow from cylinders C2 and C3 has been combined into exhaust passage 22, which is directed into inlet port 38. Exhaust passage 20 is in fluid communication with inlet port 32, as with FIG. 2A. The illustration of FIG. 2B represents an asymmetric inlet port configuration, wherein the inlet ports are spaced circumferentially about turbine 28, but do not have the same effective flow area, e.g., as manifested by the fact that inlet port 32 is approximately 120° in arc length, whereas inlet port 38 is approximately 240° in arc length. Note that the arc lengths mentioned herein are illustrative only, and that the actual inlet port sizes, including arc lengths, may vary with the needs of the particular application. Openings WG represent wastegate ports, the size and location of which may vary with the needs of the application.

Figure 3A:
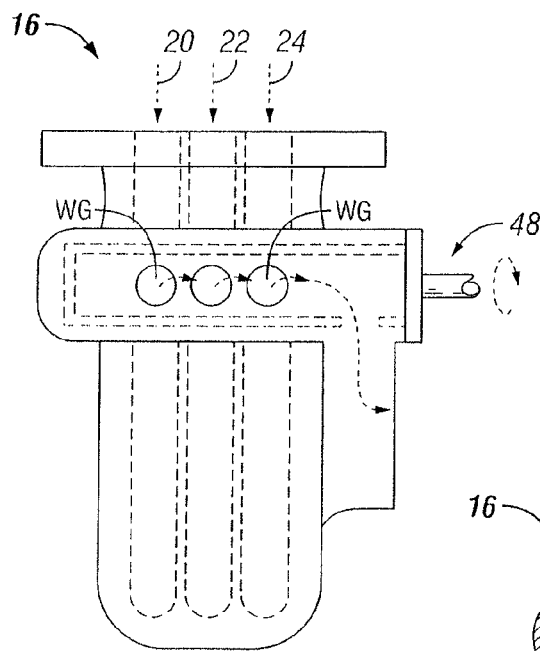
FIGS. 3A-3C schematically depict some aspects of non-limiting examples of a turbocharger and exhaust passages coupled thereto in accordance with an embodiment of the present invention.
Figure 3B:
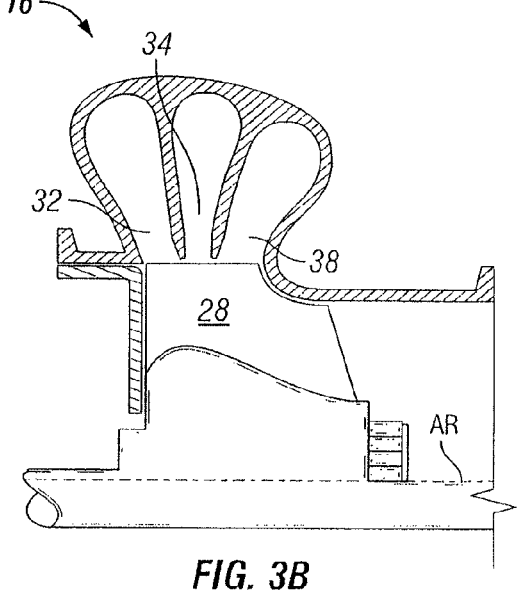
Figure 3C:
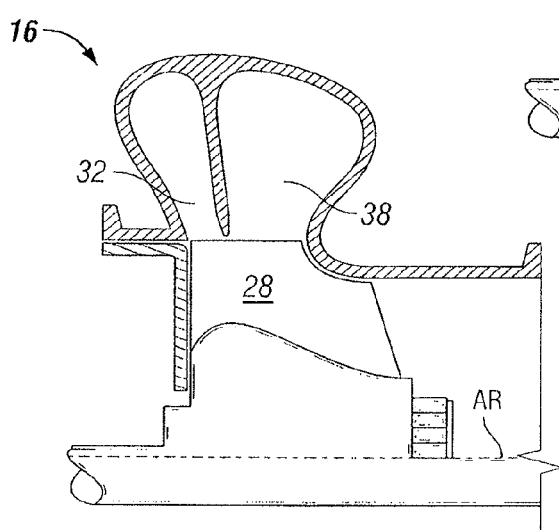

Referring now to FIGS. 3A-3C, some aspects of a non-limiting example of a turbocharger having axially arranged turbine 28 inlet ports is schematically illustrated in accordance with an embodiment of the present invention. In FIGS. 3A and 3B, exhaust passages 20, 22 and 24 are illustrated as being in fluid communication with respective inlet ports 32, 34 and 36, and are isolated from each other as much as is practicable. The illustration of FIGS. 3A and 3B represents a symmetric inlet port configuration, wherein the inlet ports are spaced apart axially about turbine 28 along axis of rotation AR. In FIG. 3C, the exhaust flow from cylinders C2 and C3 has been combined into exhaust passage 22, which is directed into inlet port 38. Exhaust passage 20 is in fluid communication with inlet port 32, as with FIGS. 3A and 3B. The illustration of FIG. 3C represents an asymmetric inlet port configuration, wherein the inlet ports are spaced axially about turbine 28, but do not have the same effective flow area, e.g., as manifested by the fact that inlet port 32 has only approximately half the axial width as inlet port 38. Openings WG represent wastegate ports, the size and location of which may vary with the needs of the application.

Figure 4A:
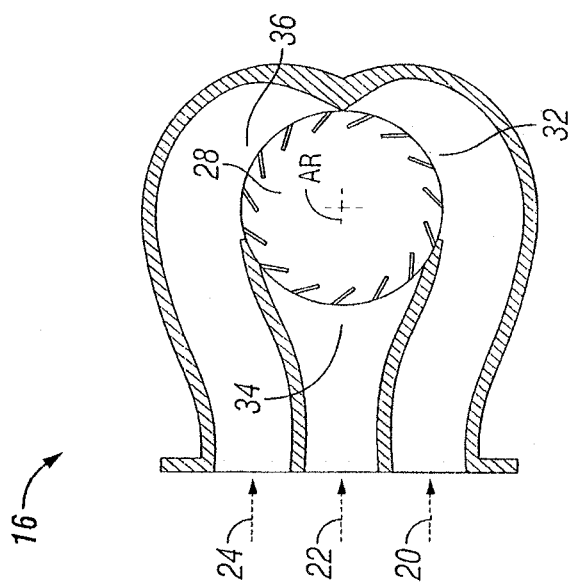
FIGS. 4A and 4B schematically depict some aspects of non-limiting examples of a turbocharger and exhaust passages coupled thereto in accordance with an embodiment of the present invention.
Figure 4B:
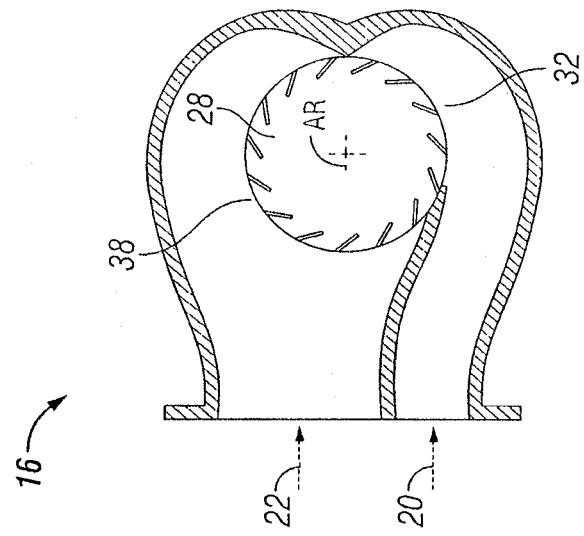

Referring now to FIGS. 4A and 4B, some aspects of a non-limiting example of a turbocharger having turbine 28 inlet ports is schematically illustrated in accordance with an embodiment of the present invention. In FIG. 4A, exhaust passages 20, 22 and 24 are illustrated as being in fluid communication with respective inlet ports 32, 34 and 36, and are isolated from each other as much as is practicable. The illustration of FIG. 4A represents a symmetric inlet port configuration, wherein the inlet ports are spaced apart circumferentially about turbine 28, and in the illustrated embodiment, each inlet port is approximately 120° in arc length. In FIG. 4B, the exhaust flow from cylinders C2 and C3 has been combined into exhaust passage 22, which is directed into inlet port 38. Exhaust passage 20 is in fluid communication with inlet port 32, as with FIG. 4A. The illustration of FIG. 4B represents an asymmetric inlet port configuration, wherein the inlet ports are spaced circumferentially about turbine 28, but do not have the same effective flow area, e.g., as manifested by the fact that inlet port 32 is approximately 120° in arc length, whereas inlet port 38 is approximately 240° in arc length. Note that the arc lengths mentioned herein are illustrative only, and that the actual inlet port sizes, including arc lengths, may vary with the needs of the particular application.

Embodiments of the present invention include an engine system, comprising: an internal combustion piston engine having a plurality of combustion cylinders, at least a first cylinder of which is a dedicated exhaust gas recirculation (EGR) cylinder; an EGR system operative to receive exhaust gas from the engine and direct at least a portion of the exhaust gas to the plurality of combustion cylinders for intake during engine operation; a turbocharger having a turbine with a plurality of inlet ports to the turbine, wherein the inlet ports are adjacent to the turbine and are spaced apart from each along the turbine; a plurality of exhaust passages, including: a first exhaust passage fluidly coupling the dedicated EGR cylinder with the EGR system and operative to supply exhaust gases from the dedicated EGR cylinder to the EGR system; a second exhaust passage fluidly coupling a second cylinder of the plurality of combustion cylinders to a first inlet port of the plurality of inlet ports of the turbine; and a third exhaust passage fluidly coupling a third cylinder of the plurality of combustion cylinders to a second inlet port of the plurality of inlet ports of the turbine.

In a refinement, the second and third exhaust passages are structured to separate pressure events originating in the second cylinder from pressure events originating in the third cylinder.

In another refinement, the third exhaust passage also fluidly couples a fourth cylinder of the plurality of combustion cylinders to the second inlet port of the turbine.

In yet another refinement, the second inlet port has a greater effective flow area than the first inlet port.

In still another refinement, the turbine includes a nozzle; and wherein the nozzle has a greater effective flow area at the second inlet port than the effective flow area of the nozzle at the first inlet port.

In yet still another refinement, the engine system further comprises a fourth exhaust passage of the plurality of exhaust passages fluidly coupling a fourth cylinder of the plurality of combustion cylinders to a third inlet port of the plurality of inlet ports of the turbine.

In a further refinement, the engine system further comprises at least one passage configured and operative to direct exhaust gases: from the first exhaust passage to another exhaust passage of the plurality of exhaust passages; from another exhaust passage of the plurality of exhaust passages to the first exhaust passage; from the first exhaust passage to the turbocharger; from the EGR system to another exhaust passage of the plurality of exhaust passages; and/or from another exhaust passage of the plurality of exhaust passages to the EGR system.

In a yet further refinement, the inlet ports are spaced apart from each other along the turbine in an axial direction.

In a still further refinement, the inlet ports are spaced apart from each other along the turbine in a circumferential direction.

In a yet still further refinement, the engine system further comprises a wastegate valve operative to bleed exhaust gases from at least one of the second exhaust passage and the third exhaust passage.

Embodiments of the present invention include an engine system, comprising: an EGR system; a turbocharger having a turbine; and an internal combustion piston engine having a first cylinder in fluid communication with the EGR system; a second cylinder in direct fluid communication with the turbine; and a third cylinder in fluid communication with the turbine, wherein the second cylinder and the third cylinder are essentially not in fluid communication with each other.

In a refinement, the engine system further comprises a fourth cylinder.

In another refinement, the fourth cylinder is in fluid communication with the turbine.

In yet another refinement, the engine system further comprises an exhaust passage, wherein the fourth cylinder and the third cylinder are in fluid communication with the turbine via the exhaust passage.

In still another refinement, the engine system further comprises a first exhaust passage; a second exhaust passage; and a third exhaust passage, wherein the first, second and third exhaust passages are substantially isolated from each other.

In yet still another refinement, the engine system further comprises a first exhaust passage; a second exhaust passage; and a third exhaust passage, wherein at least two of the first, second and third exhaust passages are substantially isolated from each other.

Embodiments of the present invention include a method of operating an engine, comprising: delivering exhaust gases from a first cylinder of an internal combustion engine as dedicated EGR cylinder to an EGR system; delivering exhaust gases from a second cylinder of the internal combustion engine to a turbocharger; delivering exhaust gases from a third cylinder of the internal combustion engine to a turbocharger; and isolating the exhaust gases from the second cylinder from the exhaust gases from the third cylinder prior to entry into the turbine.

In a refinement, the method further comprises delivering the exhaust gases from the second cylinder of the internal combustion engine to a first inlet port of a turbine of the turbocharger; and delivering the exhaust gasses from the third cylinder of the internal combustion engine to a second inlet port of a turbine of the turbocharger; and isolating the first inlet port from the second inlet port.

In another refinement, the method further comprises delivering exhaust gases from a fourth cylinder of the internal combustion engine to the turbocharger; and isolating the exhaust gases from the fourth cylinder from the exhaust gases of the second cylinder and the third cylinder prior to entry into the turbine.

In yet another refinement, the method further comprises delivering exhaust gases from a fourth cylinder of the internal combustion engine to the turbocharger; and combining the exhaust gases from the fourth cylinder with the exhaust gases of one of the second cylinder and the third cylinder prior to entry into the turbine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An engine system, comprising:
   an internal combustion piston engine having a plurality of combustion cylinders, at least a first cylinder of which is a dedicated exhaust gas recirculation (EGR) cylinder;
   an EGR system operative to receive exhaust gas from the engine and direct at least a portion of the exhaust gas to the plurality of combustion cylinders for intake during engine operation;
   a turbocharger having a turbine with a plurality of inlet ports to the turbine, wherein the inlet ports are adjacent to the turbine and are spaced apart from each along the turbine;
   a plurality of exhaust passages, including:
   a first exhaust passage fluidly coupling the dedicated EGR cylinder with the EGR system and operative to supply exhaust gases from the dedicated EGR cylinder to the EGR system;
   a second exhaust passage fluidly coupling, a second cylinder of the plurality of combustion cylinders to a first, inlet port of the plurality of inlet ports of the turbine;
   a third exhaust passage fluidly coupling a third cylinder of the plurality of combustion cylinders to a second inlet port of the plurality of inlet ports of the turbine, wherein the third exhaust passage is fluidly isolated from the second exhaust passage, the first exhaust passage is fluidly isolated from the turbine, and the first exhaust passage is fluidly isolated from the second and third exhaust passages; and
   a fourth exhaust passage fluidly coupling a fourth cylinder of the plurality of combustion cylinders to a third inlet port of the plurality of inlet ports of the turbine, wherein the fourth exhaust passage is fluidly isolated from the first, second, and third exhaust passages.

2. The engine system of claim 1, wherein the second and third exhaust passages are structured to separate pressure events originating in the second cylinder from pressure events originating in the third cylinder.

3. The engine system of claim 1, further comprising at least one passage including a valve, and with the valve open, the at least one passage is configured and operative to direct exhaust gases from the first exhaust passage to the turbocharger.

4. The engine system of claim 1, wherein the inlet ports are spaced apart from each other along the turbine in an axial direction.

5. The engine system of claim 1, wherein the inlet ports are spaced apart from each other along the turbine in a circumferential direction.

6. The engine system of claim 1, further comprising a wastegate valve operative to bleed exhaust gases from at least one of the second exhaust passage and the third exhaust passage.

7. An engine system, comprising:
   an EGR system;
   a turbocharger having a turbine; and
   an internal combustion piston engine having a first cylinder in fluid communication with the EGR system through a first exhaust passage; a second cylinder in direct fluid communication with the turbine through a second exhaust passage; and a third cylinder in fluid communication with the turbine through a third exhaust passage, wherein the first exhaust passage, the second exhaust passage, and the third exhaust passage are in fluid isolation from each other and the first exhaust passage is in fluid isolation from the turbine, and further comprising a fourth cylinder and a fourth exhaust passage and the fourth cylinder is in fluid communication with the turbine through the fourth exhaust passage, wherein the first, second, third and fourth exhaust passages are in fluid isolation from each other and each of the second, third and fourth exhaust passages is connected to the turbine with respective ones of first, second and third inlet ports to the turbine, and each of the first, second and third inlet ports includes a wastegate.

8. A method of operating an engine, comprising:

delivering exhaust gases from a first cylinder of an internal combustion engine as dedicated EGR cylinder to an EGR system through a first exhaust passage;

delivering exhaust gases from a second cylinder of the internal combustion engine to a first inlet port of a turbine of a turbocharger through a second exhaust passage;

delivering exhaust gases from a third cylinder of the internal combustion engine to a second inlet port of the turbine through a third exhaust passage;

delivering exhaust gases from a fourth cylinder of the internal combustion engine to a third inlet port of the turbine through a fourth exhaust passage; and fluidly isolating the exhaust gases in the second exhaust passage from the exhaust gases in the third exhaust passage prior to entry into the turbine, fluidly isolating the exhaust gases in the first exhaust passage from the turbine, and fluidly isolating the exhaust gases in the first exhaust passage from the exhaust gases in the second and third exhaust passages, wherein the exhaust gases in the fourth exhaust passage are fluidly isolated from the exhaust gases in the first, second and third exhaust passages.

* * * * *